(No Model.)
D. W. SPARKS.
METALLIC FENCE POST.
No. 249,803. Patented Nov. 22, 1881.
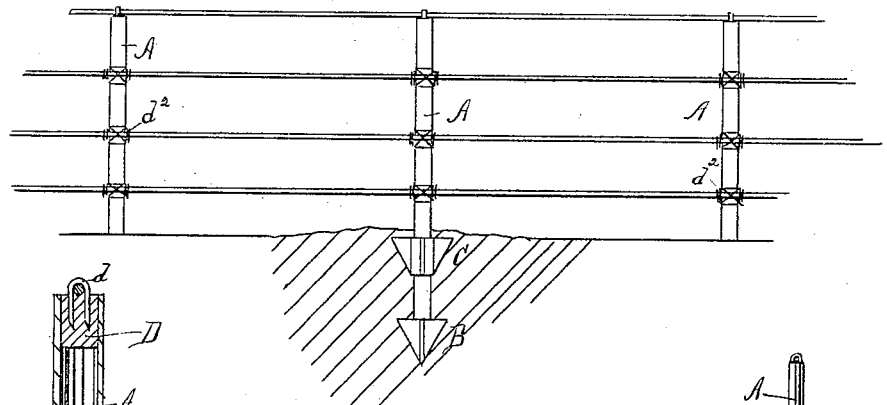
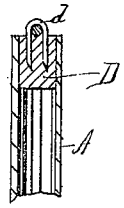
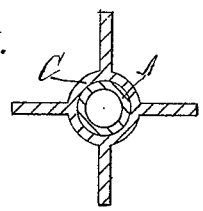
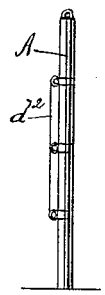
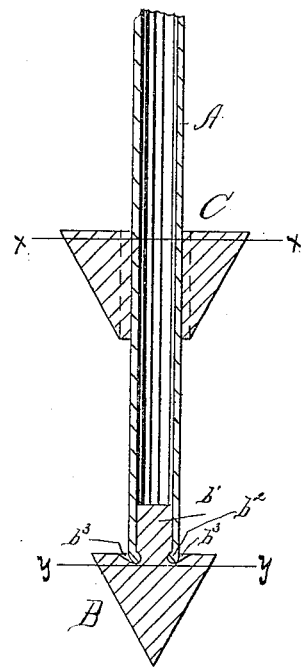
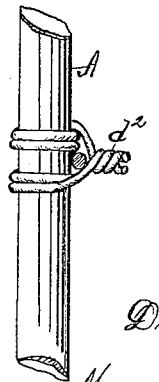
Witnesses—
P. Everett Brown
H. W. Munday.
Inventor—
David W. Sparks,
per Munday Evarts & Adcock
his Attys.

UNITED STATES PATENT OFFICE.

DAVID W. SPARKS, OF WYANET, ILLINOIS.

METALLIC FENCE-POST.

SPECIFICATION forming part of Letters Patent No. 249,803, dated November 22, 1881.

Application filed August 8, 1881. (No model.)

*To all whom it may concern:*

Be it known that I, DAVID W. SPARKS, of Wyanet, county of Bureau, and State of Illinois, have invented certain Improvements in Metallic Fence-Posts, of which the following is a specification.

My invention relates more particularly to fence-posts for use upon wire fences.

Heretofore metallic posts have been made; but their construction has been either so faulty or so complicated and expensive as not to combine the requisite degree of efficiency with sufficient cheapness and simplicity to bring them into any general use.

The object of the present invention is to provide a metallic post at once light, cheap, simple, and durable, which may be readily inserted into the ground by driving, and which will at the same time present sufficient bearing-surface thereto to make it stand almost, if not quite, as rigidly as an ordinary wooden post, and also a simple, cheap, and efficient means of securing the fence-wires thereto, the whole being so constructed as to admit of being packed in compact form for transportation; and to this end my invention consists in a metallic fence-post made of an ordinary piece of gas-pipe, having two cast flanges or bearings attached thereto, one at one end forming the bottom or point of the post, and the other near the surface of the ground. The bottom flange, which is pointed so as to be readily driven into the ground to the desired depth, is secured to the gas-pipe by a central pin or projection fitting inside the end of the pipe, and which is cast a little smaller near its base, so as to form a groove into which the edges of the gas-pipe may be slightly turned, so as to rigidly secure the flange to the pipe. The top of the flange surrounding the pin is made slightly conical or tapering toward the pin, so that the act of driving the post into the ground will operate to turn or incline the edges of the pipe into said groove. The upper flange is provided with a hole, so that the same may be slipped over the top of the post and then driven into the ground. By employing two flanges, one at the bottom and one near the surface of the ground, I am enabled to plant the post much more rigidly than can be done where a single flange or bearing-surface is employed, whether the same be on the end of the post or near the surface of the ground, and at the same time make the two flanges much smaller and lighter in their aggregate weight than heretofore it has been customary to make the single flange. I thus not only secure an advantage in cheapness due to diminished weight of the castings, but, as is obvious, my post may be much more readily driven into the ground and to a greater depth, and where the posts are to be driven into a very hard and gravelly soil I can make the bottom flange comparatively small in respect to the upper one, so as to lessen the difficulty of driving it in without affecting the rigidity of the post in the ground. Into the top of the post I drive a wooden plug, which at once serves to exclude wet and moisture from the interior of the pipe, and into which an ordinary staple may be driven to secure the top fence-wire to the post. This plug, if preferred, may also be made of metal and provided with a slot or groove for the insertion of the wire. The other fence-wires I secure to the post by simply wrapping an ordinary piece of wire once or more around the post, both above and below the fence-wire, the wire being preferably wrapped once or more around the fence-wire also, and the ends twisted together. In this way the fence-wires may be very easily and quickly attached to the post, and in such manner, too, as to be readily removed therefrom in case it should be desired to move the fence. The ends of these wrapping-wires may be made pointed and allowed to project, so as to serve as barbs, if preferred. By securing the fence-wires to the post in this way I am enabled to dispense with the usual expensive devices for fastening the wires to the post, thereby materially diminishing its cost.

In the accompanying drawings, which form a part of this specification, and in which similar letters of reference indicate like parts, Figure 1 is a side elevation of a device embodying my invention. Fig. 2 is a central longitudinal section. Fig. 3 is a cross-section on line $xx$ of Fig. 2. Fig. 4 is a cross-section on line $yy$ of Fig. 2. Fig. 5 is a side view, illustrating a modified form of fastening the fence-wires to the post. Fig. 6 is a section showing the manner of securing the top wire when the plug in the end of the post is made of metal. Fig. 7 shows the fastening for the fence-wires.

In said drawings, A represents a piece of ordinary gas-pipe; B, the lower flange, which is pointed so as to be readily driven into the ground, and provided with wings $b$, two or more, in order to present as large a bearing-surface as possible to the ground with the least weight of metal.

$b'$ is a central pin or projection, preferably formed on the flange B at the time of casting, of such diameter as to fit readily in the end of the gas-pipe. The base of the pin $b'$ is provided with a circular groove, $b^2$, and the top of the flange B surrounding said pin has a conical depression, $b^3$, so that when the hollow pipe is fitted over the pin and driven into the ground said depression will cause the end or edge of the pipe to slightly bend or curve into the groove $b^2$, thus securing the flange to the pipe at the same time it is driven into the ground. The upper flange, C, has a central hole or opening, so that the flange may be slipped over the end of the post and driven into the ground a suitable distance by blows delivered on either side.

D is a plug driven into the top of the post. If the same is made of wood, I use a staple, $d$, to secure the top fence-wire thereto. If the plug is made of iron, I provide the same with a slot, $d'$, so that the prongs of the plug fit astride the wire; or other suitable device may be employed for fixing the fence-wire thereto.

The lower fence-wires I secure to the post by short pieces of wire $d^2$, wrapped around the post both above and below the fence-wire, and crossed over or wrapped around the fence-wire.

Instead of employing a separate piece of wrapping-wire to secure each fence-wire, one continuous piece of wire may be used, as shown in Fig. 5. If separate pieces are employed for each fence-wire, I prefer to twist the two ends together.

The wire may be given any desired number of coils around the post; but I usually find two to be sufficient. If the ends of the wire are twisted together, one coil around the post above and below the fence-wire will suffice to hold the same firmly in place.

Some of the advantages of my invention may be secured by employing an angular or flange-shaped rod of iron in place of the hollow pipe, in connection with my upper and lower flanges, and in which case the lower flange should be provided with a hole or socket for securing the same to the rod; but I prefer to use the hollow pipe, though I do not wish to limit myself thereto.

For purpose of transportation the pipes and flanges should be packed separately, all the parts of the post being so constructed as to be readily secured together when the post is driven into the ground.

Having thus fully described my invention, I claim—

1. The improved metallic fence-post consisting of the combination of the hollow pipe with lower pointed flange, B, and upper flange, C, substantially as specified.

2. The combination of hollow pipe A with upper flange, C, and flange B, secured to the end of said pipe by a pin, $b'$, provided with groove $b^2$, substantially as specified.

3. The pointed flange B, provided with conical recess $b^3$ and pin $b'$, having groove $b^2$, in combination with pipe A, whereby said flange may be secured to the pipe by the act of driving the post into the ground, substantially as specified.

DAVID W. SPARKS.

Witnesses:
J. S. TUCKER,
L. UHLENDORF.